US010074357B2

(12) United States Patent
Manipatruni et al.

(10) Patent No.: US 10,074,357 B2
(45) Date of Patent: Sep. 11, 2018

(54) INTEGRATED ACOUSTIC PHASE ARRAY

(71) Applicant: Intel Corporation, Santa Clara, CA (US)

(72) Inventors: Sasikanth Manipatruni, Hillsboro, OR (US); Kelin J. Kuhn, Aloha, OR (US); Debendra Mallik, Chandler, AZ (US); John C. Johnson, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 326 days.

(21) Appl. No.: 14/877,602

(22) Filed: Oct. 7, 2015

(65) Prior Publication Data

US 2016/0027429 A1 Jan. 28, 2016

Related U.S. Application Data

(63) Continuation of application No. 13/725,773, filed on Dec. 21, 2012, now Pat. No. 9,183,829.

(51) Int. Cl.
*G01K 11/32* (2006.01)
*G10K 11/34* (2006.01)

(52) U.S. Cl.
CPC ........ *G10K 11/346* (2013.01); *A41D 2400/00* (2013.01)

(58) Field of Classification Search
CPC ........ B81B 3/0021; H02K 33/16; H02K 7/10; H02K 16/00; H02K 2201/18; H02N 13/00; H04R 1/005; H04R 1/403; H04R 3/12; H04R 1/20
See application file for complete search history.

(56) References Cited

U.S. PATENT DOCUMENTS 3,821,740 A * 6/1974 Ehrlich ................ G10K 11/346 342/374
4,333,028 A 6/1982 Panton
9,183,829 B2 11/2015 Manipatruni et al.
2010/0166242 A1* 7/2010 Cohen .................. B81B 3/0021 381/332

FOREIGN PATENT DOCUMENTS

| | | |
|---|---|---|
| CN | 101588524 A | 11/2009 |
| EP | 1551205 | 7/2005 |
| JP | 2003/509984 | 3/2003 |
| JP | 2006/109340 | 4/2008 |
| TW | I540571 B | 7/2016 |
| WO | WO-2011/029103 | 3/2011 |

OTHER PUBLICATIONS

Office Action including Search Report (5 pages) dated Feb. 14, 2017 issued by the Examiner of the Intellectual Property Office (the IPO) for Taiwan Patent Application No. 105112607 and English Translation (6 pages) thereof.

(Continued)

*Primary Examiner* — Luke D Ratcliffe
(74) *Attorney, Agent, or Firm* — Schwabe, Williamson & Wyatt, P.C.

(57) ABSTRACT

A system includes a processor and a phased array, coupled to the processor, having an arrayed waveguide for acoustic waves to enable directional sound communication.

19 Claims, 5 Drawing Sheets

(56) References Cited

OTHER PUBLICATIONS

Second Office Action dated Apr. 5, 2017 from the Chinese Intellectual Property Office (IPO) for Chinese Patent Application No. 201310757192.6, 3 pages.
Communication pursuant to 70(2) and 70a(2) EPC from the European Patent Office dated Dec. 18, 2017 for European Patent Application No. 13195690.6-1559/2747076 (2 pages).
Patent Grant Certificate (1 page) issued Oct. 21, 2017 from Taiwan Intellectual Property Office for Taiwan Patent Application No. 105112607 and English Translation (1 page) thereof.
Notice of Allowance dated Jul. 25, 2017 from Taiwan Intellectual Property Office for Taiwan Patent Application No. 105112607 (2 pages).
Letters Patent (2 pages) issued Oct. 27, 2017 from Chinese Patent Office for Chinese Patent Application ZL 201310757192.6 and English Translation (1 page) thereof.

* cited by examiner

Figure 1
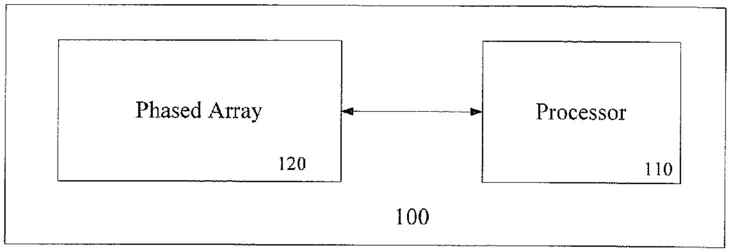
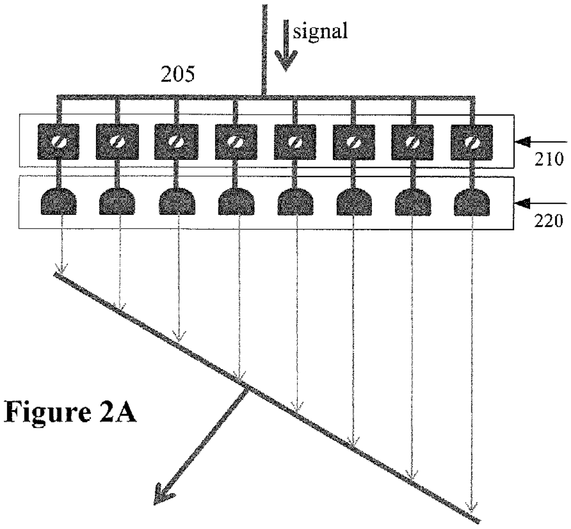
Figure 2A
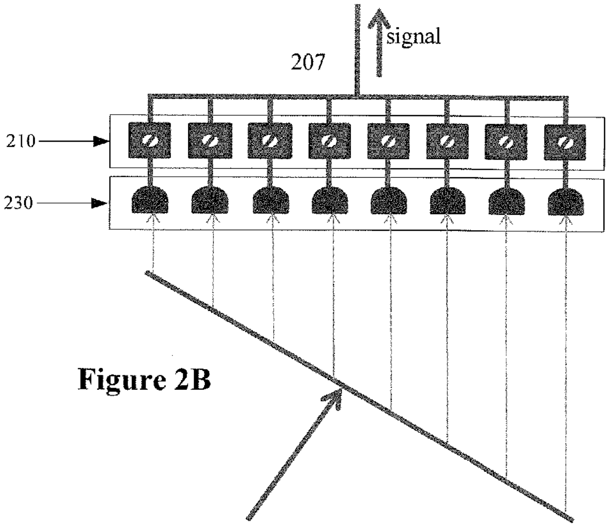
Figure 2B

INTEGRATED ACOUSTIC PHASE ARRAY

The present patent application is a Continuation application claiming priority from application Ser. No. 13/725,773, filed Dec. 21, 2012.

FIELD OF THE INVENTION

The present disclosure generally relates to a mechanism for implementing remote sound communication.

BACKGROUND

Current methods and systems that compensate for noise interference are a passive means of reducing the interfering noise surrounding. For example, voice interfaces are typically not available in crowded environments because computer voice recognition is not operable in a noisy, crowded environment. Additionally, one to one personal directional sound communication mechanisms do not exist without the use of a telephone connection.

BRIEF DESCRIPTION OF THE DRAWINGS

FIG. 1 illustrates one embodiment of an acoustic system.

FIGS. 2A and 2B illustrate embodiments of a phased array.

DETAILED DESCRIPTION

Figure 3:
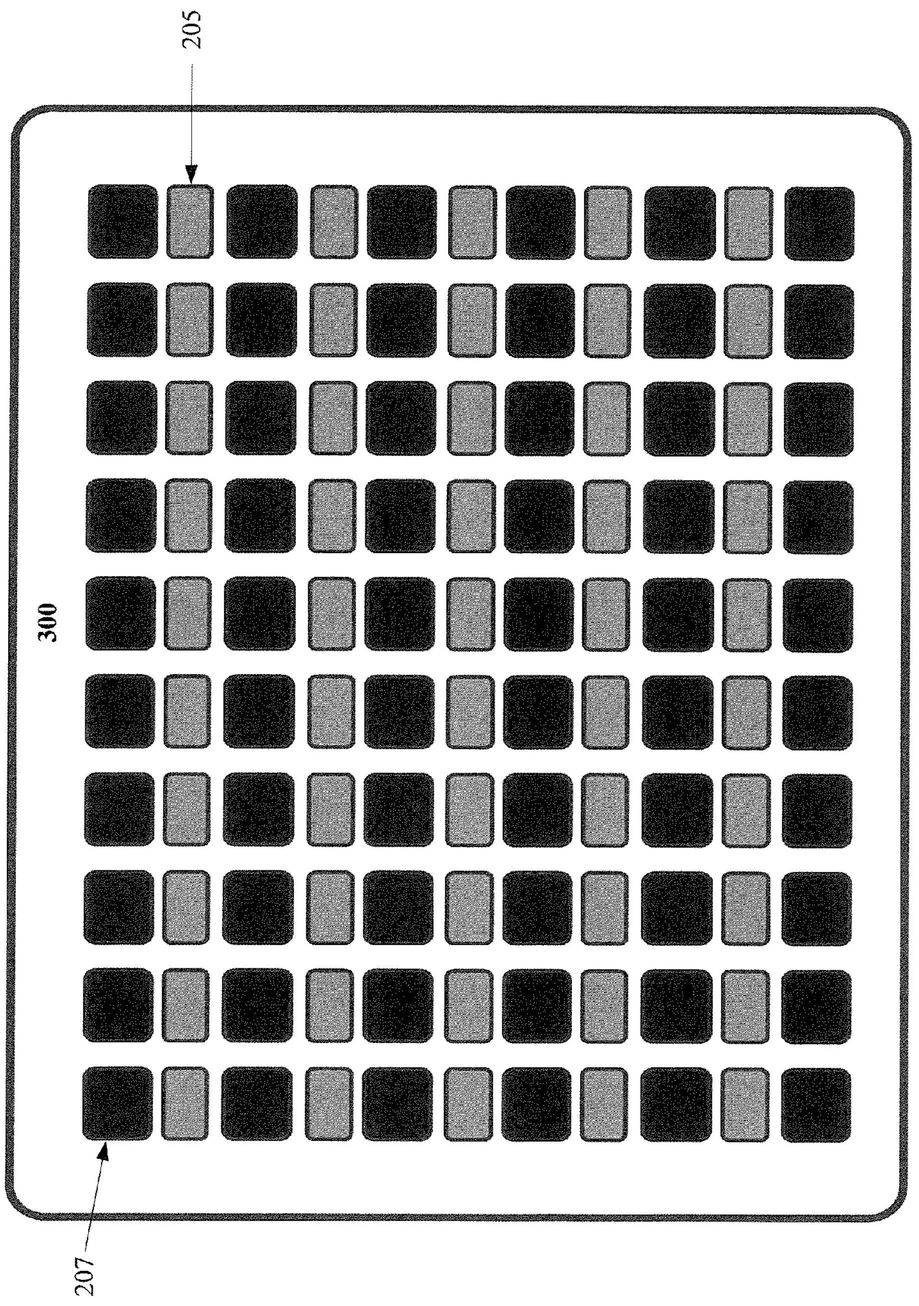
FIG. 3 illustrates one embodiment of a display device.

In the following description, numerous specific details are set forth in order to provide a thorough understanding of various embodiments. However, various embodiments of the invention may be practiced without the specific details. In other instances, well-known methods, procedures, components, and circuits have not been described in detail so as not to obscure the particular embodiments of the invention.

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

FIG. 1 illustrates one embodiment of an acoustic system 100. System 100 includes a phased array 120 and processor 110. According to one embodiment, processor 110 is an application processor (e.g., system on a chip (SoC)) designed to support applications running in an operating system environment. Thus, processor 110 provides a self-contained operating environment that delivers all system capabilities needed to support an acoustic application, as well as those for other computing applications (e.g., including memory management, graphics processing and multimedia decoding). In other embodiments, processor 110 may be implemented by an application specific integrated circuit (ASIC).

According to one embodiment, phased array 120 includes an arrayed waveguide for acoustic waves that enables directional and enhanced range sound communication. Thus, phased array 120 includes a transmission component that performs a directional transmission of sound. FIG. 2A illustrates one embodiment of a phased array 205 implemented for the directional transmission of sound.

Referring to FIG. 2A, phased array 205 includes variable phase shifters 210 and micro speakers 220. In one embodiment, each phase shifter 210 receives a signal to be transmitted and produces a tuning of a direction of phase propagation (e.g., the direction of the wave propagation is set by a wavefront), in which a wavefront is defined as points of equal phase in a moving wave. The control of phase by phase shifters 210 enables the control of directionality and beam shift. Moreover, a variable configuration for each phase shifter 210 allows for a tunable steering angle. In one embodiment, phase shifters 210 are digital components. However, analog components may be implemented.

A micro speaker 220 is coupled to each phase shifter 210 to produce an audible sound in response to electrical audio signals received from a respective phase shifter 210. The result of the sound produced by the micro speakers 220 is a steered acoustic wavefront generated at phased array 205. In one embodiment, micro speakers 220 are piezoelectric speakers at which an electromagnetic field produces a piezo response (e.g., vibration that produces sound). In another embodiment, micro speakers 220 are implemented via other technologies (e.g., micro-magnetic or Microelectromechanical systems (MEMS)).

In a further embodiment, the arrayed waveguide may comprise a reception component implemented to selectively eliminate noise sources from an ambient environment at a user location. FIG. 2B illustrates one embodiment of a phased array 207 implemented for the directional reception of sound. In such an embodiment, micro speakers 220 are replaced with micro receivers (or micro phones) 230. In a further embodiment, micro receivers 230 may be smaller than micro speakers 220 since less power is necessary to receive, rather than transmit sound.

In a direction reception embodiment, micro receivers 230 are controlled by variable phase shifters 210 control directionality and beam shift, and enable a tunable starring angle. As discussed above with reference to micro speakers 220, micro receivers 230 may utilize piezoelectric, micro-magnetic or MEMS components.

According to one embodiment, phased arrays 120 (e.g., 205 and/or 207) may be integrated into a monitor or display device to form a two-dimensional array for three-dimensional angular control of acoustic signals. FIG. 3 illustrates one embodiment of a display device 300 incorporating phased array 205 and 207.

Integration of phased arrays 120 into electronic displays may also produce noise cancelled environments. Noise cancelled environments provide a superior voice interface with computers systems. In such an embodiment, integrated phase arrays 120 include transparent acoustic transmitters and transparent acoustic receivers. The ambient noise is sensed via a phased array 207 and an opposing phase cancellation sound is generated using the phase arrays 205 to create a noise cancelled environment. In a further embodiment, a digital algorithm is used to separate the local sounds from the remote noise sources.

Figure 4:
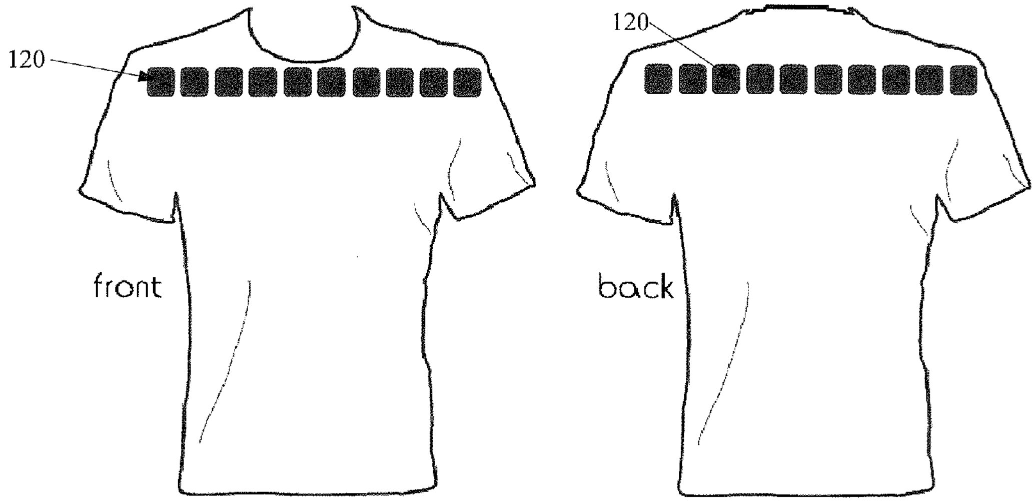
FIG. 4 illustrates one embodiment of a crowded environment with multiple voice controlled computer systems.

In one embodiment, a noise cancelled environment permits the implementation of a crowded environment with multiple voice controlled computer devices. FIG. 4 illustrates one embodiment of a crowded environment with multiple voice controlled computer systems. As shown in FIG. 4, the noise cancelled environment effectively provides a virtual acoustic insulated box for each user.

Figure 5:
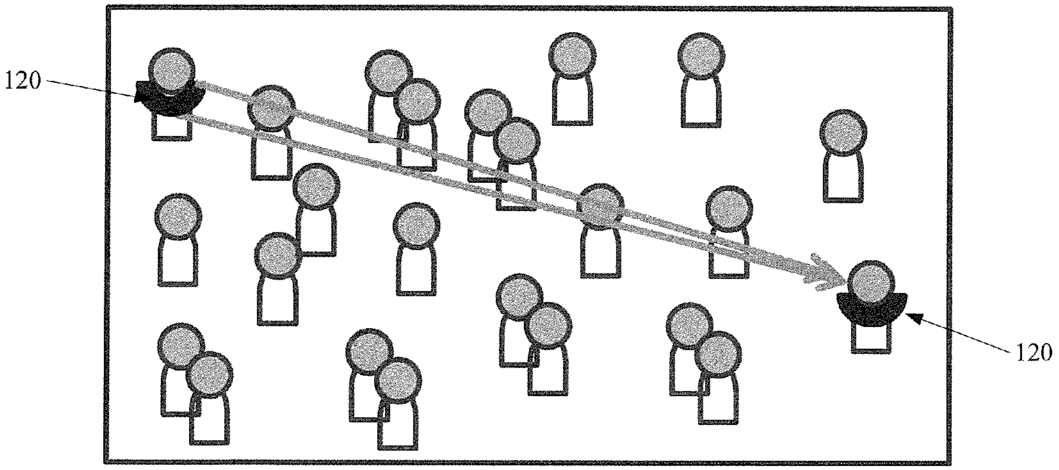
FIG. 5 illustrates one embodiment of a wearable acoustic phased array.

In another embodiment, phased arrays 120 may be integrated on to user clothing to enable directional transmission/reception of sound. FIG. 5 illustrates one embodiment in which wearable acoustic phased arrays are integrated on a shirt to enable one to one communication. Such one to one communication may be implemented in a remote whispering system.

Figure 6:
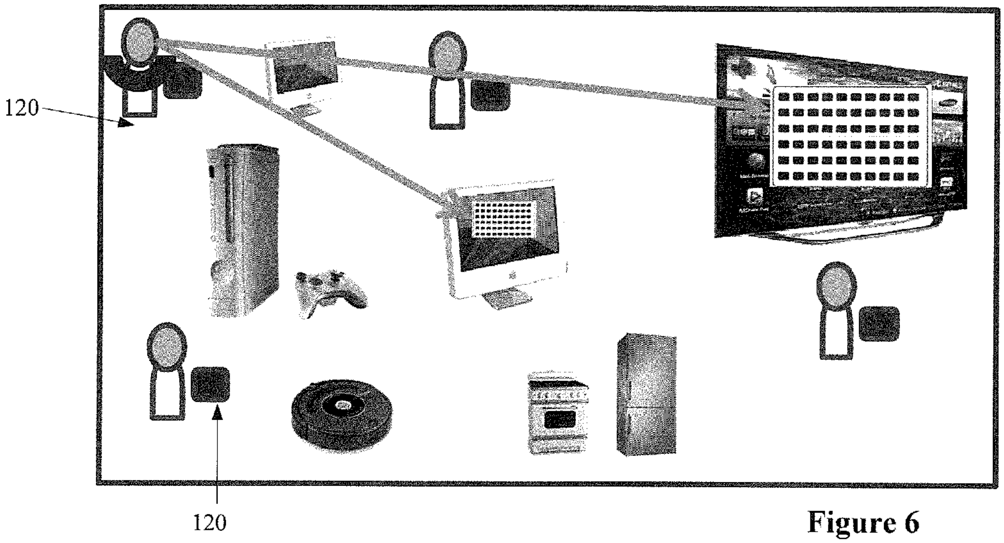
FIG. 6 illustrates one embodiment of a crowded room/office environment.

In one embodiment, a remote whispering system enables a personal directional sound communication method where a one to one communication can be established in a crowded room between two people or between one person and a computer system using a phase array for sound reception and transmission. FIG. 6 illustrates one embodiment of a crowded room/office environment in which phase arrays 120 are used. In such an embodiment, the sending system/user aims the signal at the appropriate location. Further, a visual or electronic honing system may be used to steer the sound to the proper location. In this embodiment, the honing system is either manually controlled or uses a pointer operated by the user.

Figure 7:
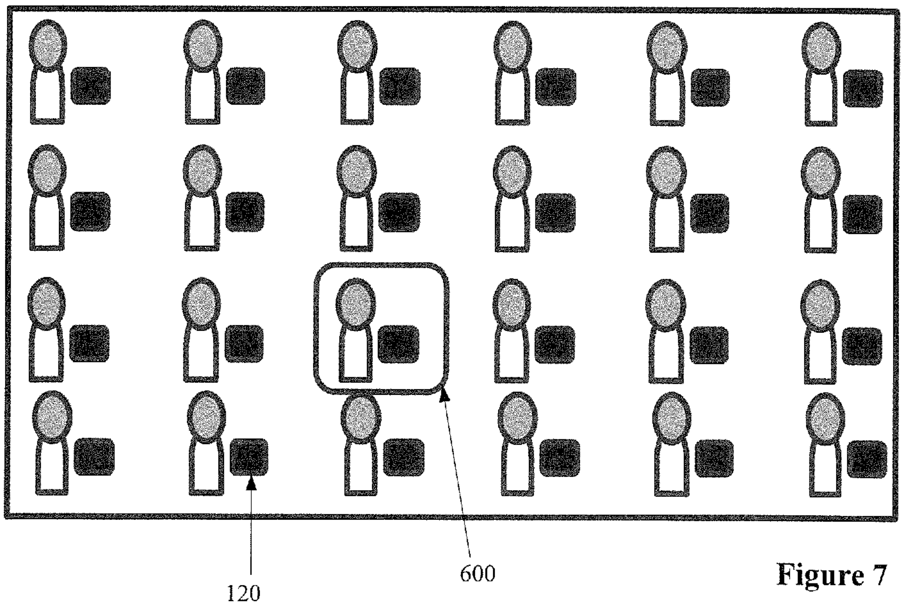
FIG. 7 illustrates one embodiment of voice controlled electronics with acoustic phased arrays.

Phase arrays 120 may also be used in multiple voice controlled electronics located in a home environment. Thus, a user may have direct personal sound communication with consumer electronic devices via phase arrays 120. FIG. 7 illustrates one embodiment of such a home environment having voice controlled electronics with acoustic phased arrays 120.

Although not described specifically herein, phased arrays 120 may be incorporated in other types of devices to provide for a directional transmission/reception of sound. For instance, phased arrays 120 may be included in small form factor mobile computers such as tablets, telephones, Global Positioning Systems (GPSs), etc.

The above-described mechanism allows for one to one sound communication in a crowded noisy environment between humans or human and a computer system. The mechanism also enables increased range and addressability of sound communications, large number of users to use voice interface to computers and electronics, as well as creates scalable noise controlled (via removal of ambient noise) environments.

Figure 8:
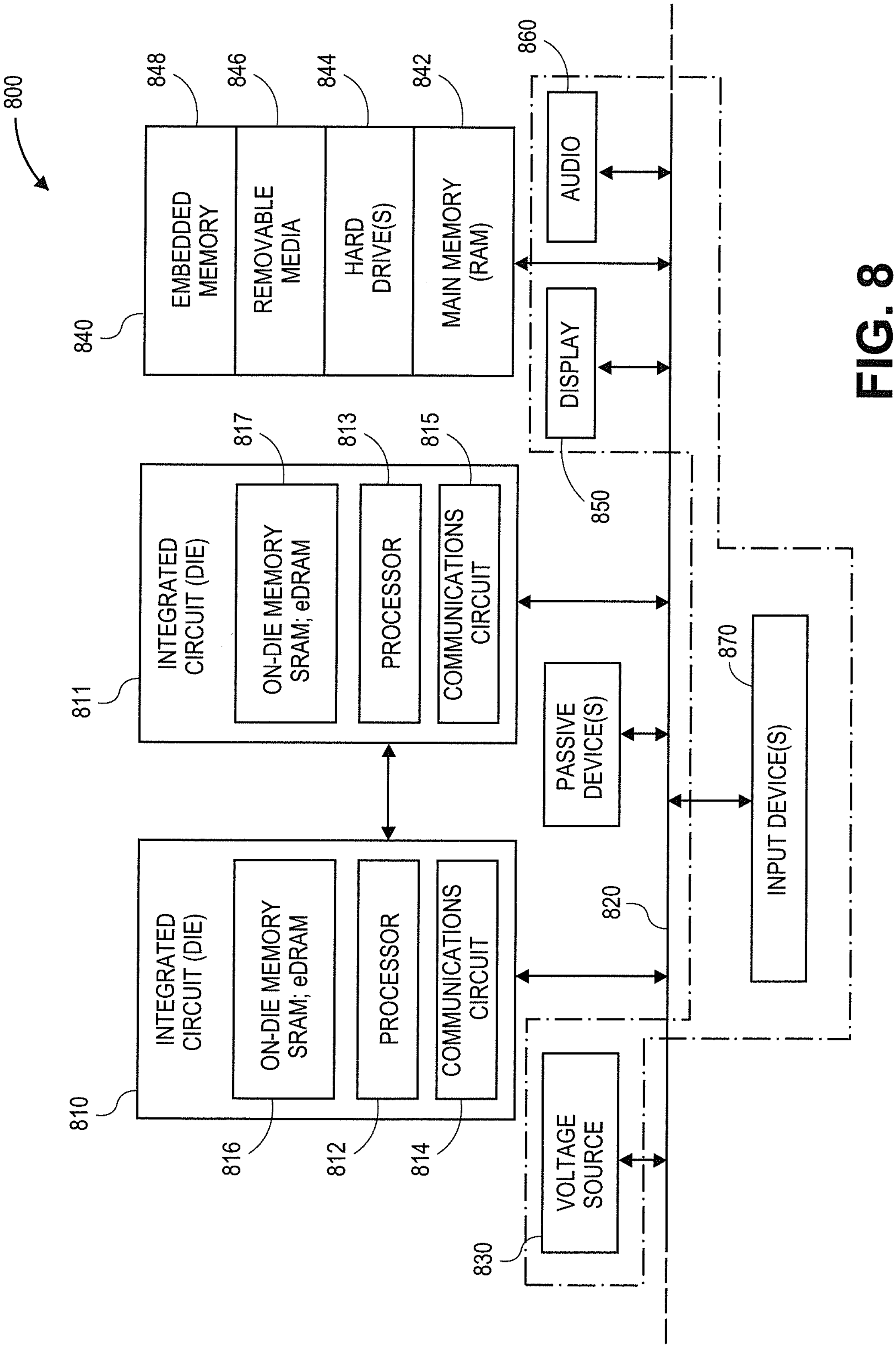
FIG. 8 illustrates one embodiment of a computer system.

FIG. 8 illustrates one embodiment of a computer system 800. The computer system 800 (also referred to as the electronic system 800) as depicted can embody acoustic system 100. The computer system 800 may be a mobile device such as a netbook computer. The computer system 800 may be a mobile device such as a wireless smart phone. The computer system 800 may be a desktop computer. The computer system 800 may be a hand-held reader. The computer system 800 may be a server system. The computer system 800 may be a supercomputer or high-performance computing system.

In an embodiment, the electronic system 800 is a computer system that includes a system bus 820 to electrically couple the various components of the electronic system 800. The system bus 820 is a single bus or any combination of busses according to various embodiments. The electronic system 800 includes a voltage source 830 that provides power to the integrated circuit 810. In some embodiments, the voltage source 830 supplies current to the integrated circuit 810 through the system bus 820.

The integrated circuit 810 is electrically coupled to the system bus 820 and includes any circuit, or combination of circuits according to an embodiment. In an embodiment, the integrated circuit 810 includes a processor 812 that can be of any type. As used herein, the processor 812 may mean any type of circuit such as, but not limited to, a microprocessor, a microcontroller, a graphics processor, a digital signal processor, or another processor. In an embodiment, the processor 812 includes a processor 110 as disclosed herein.

In an embodiment, SRAM embodiments are found in memory caches of the processor. Other types of circuits that can be included in the integrated circuit 810 are a custom circuit or an application-specific integrated circuit (ASIC), such as a communications circuit 814 for use in wireless devices such as cellular telephones, smart phones, pagers, portable computers, two-way radios, and similar electronic systems, or a communications circuit for servers. In an embodiment, the integrated circuit 810 includes on-die memory 816 such as static random-access memory (SRAM). In an embodiment, the integrated circuit 410 includes embedded on-die memory 816 such as embedded dynamic random-access memory (eDRAM).

In an embodiment, the integrated circuit 810 is complemented with a subsequent integrated circuit 811. Useful embodiments include a dual processor 813 and a dual communications circuit 815 and dual on-die memory 817 such as SRAM. In an embodiment, the dual integrated circuit 810 includes embedded on-die memory 417 such as eDRAM.

In an embodiment, the electronic system 800 also includes an external memory 840 that in turn may include one or more memory elements suitable to the particular application, such as a main memory 842 in the form of RAM, one or more hard drives 844, and/or one or more drives that handle removable media 846, such as diskettes, compact disks (CDs), digital variable disks (DVDs), flash memory drives, and other removable media known in the art. The external memory 840 may also be embedded memory 848 such as the first die in an embedded TSV die stack, according to an embodiment.

In an embodiment, the electronic system 800 also includes a display device 850, an audio output 860. In an embodiment, the electronic system 800 includes an input device such as a controller 870 that may be a keyboard, mouse, trackball, game controller, microphone, voice-recognition device, or any other input device that inputs information into the electronic system 800. In an embodiment, an input device 870 is a camera. In an embodiment, an input device 870 is a digital sound recorder. In an embodiment, an input device 870 is a camera and a digital sound recorder.

As shown herein, the integrated circuit 810 can be implemented in a number of different embodiments, including an acoustic system. The elements, materials, geometries, dimensions, and sequence of operations can all be varied to suit particular I/O coupling requirements including array contact count, array contact configuration for a microelectronic die embedded in a processor mounting substrate according to any of the several disclosed semiconductor die packaged with a thermal interface unit and their equivalents. A foundation substrate may be included, as represented by the dashed line of FIG. 8. Passive devices may also be included, as is also depicted in FIG. 8.

Although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A system comprising:

a processor; and a phased array, coupled to the processor, having an arrayed component for acoustic signals to enable directional sound communication; including:

a transmission component to perform a directional transmission of sound; and a reception component to perform a directional reception of sound, wherein transmission and reception component phase arrays are integrated into a display device to form a two-dimensional array for three-dimensional angular control of acoustic signals.

2. The system of claim 1, wherein the transmission component comprises:

one or more phase shifters; and a micro speaker coupled to each of the one or more phase shifters.

3. The system of claim 2, wherein each phase shifter receives a signal to be transmitted and produces a tuning of a direction of phase propagation.

4. The system of claim 3, wherein the phase shifters have a variable configuration to enable a tunable steering angle.

5. The system of claim 2, wherein each micro speaker produces sound in response to electrical audio signals received from a respective phase shifter.

6. The system of claim 5, wherein the audible sound produced by the micro speakers is a steered acoustic wavefront.

7. The system of claim 1, wherein the reception component comprises:

one or more phase shifters; and a micro receiver coupled to each of the one or more phase shifters.

8. The system of claim 2, wherein each phase shifter receives a signal from a respective micro receiver.

9. The system of claim 8, wherein the phase shifters have a variable configuration to enable a tunable steering angle.

10. The system of claim 1, wherein integration of transmission and reception component phase arrays into a display device produces a noise cancelled environment.

11. A system comprising:

a processor; and a phased array, coupled to the processor, having an arrayed component for acoustic signals to enable directional sound communication; including:

a transmission component to perform a directional transmission of sound; and a reception component to perform a directional reception of sound wherein transmission and reception component phase arrays are integrated into clothing to enable directional transmission/reception of sound, the directional transmission/reception of sound enables establishing one to one communication in a crowded room.

12. A phased array comprising one or more phase shifters to produce an arrayed waveguide for acoustic waves to enable directional sound communication, including:

a transmission component to perform a directional transmission of sound; and a reception component to perform a directional reception of sound wherein transmission and reception component phase arrays are integrated into clothing to enable directional transmission/reception of sound wherein the directional transmission/reception of sound enables establishing one to one communication in a crowded room.

13. The phased array of claim 12, wherein the phase shifters have a variable configuration to enable a tunable steering angle.

14. The phased array of claim 12, wherein the transmission component comprises a micro speaker coupled to each of the one or more phase shifters.

15. The phased array of claim 14, wherein each phase shifter receives a signal to be transmitted and produces a tuning of a direction of phase propagation.

16. The phased array of claim 12 wherein the reception component comprises a micro receiver coupled to each of the one or more phase shifters.

17. The phased array of claim 16, wherein each phase shifter receives a signal from a respective micro receiver.

18. The phased array of claim 14, wherein the phase shifters are implemented using one of digital, analog or mixed-signal electronics.

19. The phased array of claim 14, wherein the micro speakers are comprised of one of micromechanical or a micromagnetic technologies.

* * * * *